(12) United States Patent
Suerbaum

(10) Patent No.: US 9,198,226 B2
(45) Date of Patent: Nov. 24, 2015

(54) NETWORK MANAGEMENT

(75) Inventor: Clemens Suerbaum, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 30 days.

(21) Appl. No.: 13/884,341

(22) PCT Filed: Nov. 11, 2010

(86) PCT No.: PCT/EP2010/067322
§ 371 (c)(1),
(2), (4) Date: May 9, 2013

(87) PCT Pub. No.: WO2012/062373
PCT Pub. Date: May 18, 2012

(65) Prior Publication Data
US 2013/0229914 A1    Sep. 5, 2013

(51) Int. Cl.
*H04W 84/18* (2009.01)
*H04L 12/24* (2006.01)
*H04W 24/02* (2009.01)
*H04L 12/70* (2013.01)
*H04W 24/08* (2009.01)

(52) U.S. Cl.
CPC ............ *H04W 84/18* (2013.01); *H04L 41/0823* (2013.01); *H04W 24/02* (2013.01); *H04L 2012/5623* (2013.01); *H04W 24/08* (2013.01)

(58) Field of Classification Search
USPC .............. 370/229, 230, 230.1, 232, 233, 234, 370/235, 236.1, 236.2, 237, 241, 241.1, 370/252, 254–255
See application file for complete search history.

(56) References Cited

U.S. PATENT DOCUMENTS 5,471,399 A * 11/1995 Tanaka et al. ................. 716/126
6,141,565 A * 10/2000 Feuerstein et al. ............ 455/560
(Continued)

FOREIGN PATENT DOCUMENTS

EP          2166796 A1       3/2010
WO     WO 03/037019 A1      5/2003

OTHER PUBLICATIONS

International Search Report and Written Opinion dated Sep. 16, 2011 corresponding to International Patent Application No. PCT/EP2010/067322.

(Continued)

*Primary Examiner* — Warner Wong
(74) *Attorney, Agent, or Firm* — Squire Patton Boggs (US) LLP

(57) ABSTRACT

A method of managing the operation of a network element in a communications system, the method comprising: receiving performance indicators by an optimizing function; combining together the performance indicators to produce an achievement indicator comprising weighted components of the performance indicators; using the achievement indicator to determine an optimum setting of at least one parameter value related to operation of the network element; applying the parameter value to the network element.

15 Claims, 2 Drawing Sheets

(56) References Cited

U.S. PATENT DOCUMENTS

| | | | |
|---|---|---|---|
| 6,510,139 B1* | 1/2003 | Yoshida | 370/238 |
| 7,729,270 B2* | 6/2010 | Bishop et al. | 370/252 |
| 2002/0054169 A1* | 5/2002 | Richardson | 345/854 |
| 2003/0217026 A1* | 11/2003 | Teig et al. | 707/1 |
| 2005/0020254 A1 | 1/2005 | Stephens et al. | |
| 2007/0064715 A1* | 3/2007 | Lloyd et al. | 370/401 |
| 2008/0049779 A1* | 2/2008 | Hopmann et al. | 370/431 |
| 2008/0310320 A1 | 12/2008 | Kim et al. | |
| 2009/0019147 A1* | 1/2009 | Ahlers et al. | 709/224 |
| 2009/0059793 A1* | 3/2009 | Greenberg | 370/235 |
| 2010/0002603 A1* | 1/2010 | Gupta et al. | 370/254 |
| 2010/0091745 A1* | 4/2010 | Bevan et al. | 370/338 |
| 2010/0306818 A1* | 12/2010 | Li et al. | 726/1 |
| 2011/0138291 A1* | 6/2011 | Twiddy et al. | 715/735 |
| 2011/0164502 A1* | 7/2011 | Mohan et al. | 370/236.2 |
| 2012/0072575 A1* | 3/2012 | King et al. | 709/224 |

OTHER PUBLICATIONS

Andre Schroder et al., "Distributed Self-Optimization of Handover for the Long Term Evolution," Dec. 10, 2008, XP019113422, pp. 281-286.

3GPP TS 32.522 V9.1.0 (Jun. 2010), Technical Specification, "3rd Generation Partnership Project; Technical Specification Group Services and System Aspects; Telecommunication Management; Self-Organizing Networks (SON) Policy Network Resource Model (NRM) Integration Reference Point (IRP); Information Service (IS) (Release 9)," Oct. 6, 2010, pp. 1-21, XP050461835.

Office Action dated Apr. 21, 2015, issued in corresponding CN Patent Application No. 201080070089.9 (English translation only).

* cited by examiner

NETWORK MANAGEMENT

This invention relates to management of a telecommunications network. It is particularly, but not exclusively, related to using targets in the management of self-organising networks.

As traffic patterns change away from voice towards data, bandwidth and quality of service (QoS) requirements can fluctuate wildly, and traffic load is less predictable. Handling peaks requires a network that is able to allocate bandwidth equitably to users, optimise load distribution among cells, and ensure robust mobility and handovers. Therefore, there is a need for communications systems which are able to react flexibly to traffic load which can vary considerably.

The term self-organising network (SON) is generally taken to mean a communications network in which the tasks of configuring, operating, and optimising are largely automated and so self-configuration, self-optimisation, and self-healing are possible. These tasks are carried out by using dedicated SON algorithms. SON-type networks aim to reduce operational expenses while enabling a reliable user experience even under adverse conditions such as congested traffic.

Self-configuration comprises all tasks necessary to automate the deployment and commissioning of networks and the configuration of parameters. Network elements operate autonomously, running set-up routines, authenticating and connecting to an Operational Support Systems (OSS), as well as linking up and swapping parameters with neighbouring network elements.

Self-optimisation serves to improve or recoup network quality by tuning network parameters on the fly. Key tasks involve brokering handovers and balancing loads among neighbouring cells. Load balancing loads—also called capacity based optimisation—between cells is applied during traffic congestion to distribute bandwidth equitably among users and minimise overloads that may deprive each user of bandwidth. This can be done in real-time.

Self-healing encompasses a set of key functions designed to cope with major service outages, including detection, root cause analysis, and outage mitigation mechanisms. Auto-restart and other automatic alarm features afford the network operator even more quick-response options.

As a result, SON algorithms can be applied to a number of different use cases such as handover optimisation, balancing optimisation, and interference optimisation, and a SON-type network can improve user experience by optimising the network more rapidly and mitigating outages as they occur. These are important capabilities because time-to-operation and time-to-repair are such critical factors for network operators.

SON algorithms are used to optimise network elements based on objectives and targets defined by the network operator. A particular network element may have a targeted success rate of carrying out an identified operation, for example a 97% handover success rate, based on a relevant key performance indicator (KPI). If a network management functionality which controls the network element determines that the network element operates such that it performs the identified operation at a success rate lower than the target, then it may instruct that a SON algorithm be used to carry out appropriate remedial action, for example re-configuration.

In a mobile communication system, such as a cellular system, radio access network (RAN) network elements account for a large share of the installation, deployment, and maintenance costs. Accordingly, SON-type functionality is currently focussed on the RAN in general and on base stations (BTS) in particular.

Networks often have a number of network capabilities which are not directly related to setting up and managing calls which are managed by a management architecture of a network. FIG. 1 shows a Third Generation Partnership Project (3GPP) management architecture in which the main functional blocks involved in the management of a network are presented. The architecture applies both to third generation (3G) and long term evolution (LTE) systems. The architecture is arranged in a hierarchy having at a lowest layer discrete telecommunications entities referred to as network elements (NEs) which can be managed over a specific interface. In a 3G system, the NE may be an RNC. In an LTE system, the NE may be an enhanced node B (eNodeB or eNB). Above the NE layer are element managers (EMs) which provide a package of end-user functions for the management of a set of closely related types of NEs. An EM can either be a functionality contained within a Domain Manager (DM) (system context A) which provides element management functions and domain management functions for a sub-network or can be configured as part of an NE (system context B). The DMs (or EMs) are managed by Network Managers (NMs) which provide a package of end-user functions with the responsibility for the management of a network, mainly as supported by EMs but also possibly involving direct access to the NEs. The NM layer communicates with the DM/EM layer over an interface referred to as a type 2 interface or Itf N (Interface north-bound). The combination of the EM and/or DM layer and the NM layer is often referred to as the management system of the network. Finally, the NM layer communicates with Enterprise Systems which are information systems used by a network operator which are not directly related to telecommunications aspects and include functionalities such as call centres, fraud detection and prevention systems, and invoicing systems.

The Itf-N connects the network management system to EMs (located in either a DM or in an NE). This connection is made by means of Integration Reference Points (IRPs). An IRP describes the information flow and associated objects or information elements which are used to carry out functions such as network configuration. An NM is able to monitor a 3G-telecommunication network including the managing EMs over the Itf-N. This typically involves an IRP Manager in the NM layer communicating with an IRP Agent in an EM in the EM layer.

A SON-type network can be configured in which information controlling SON functionality is transported via the Itf-N by using an interface IRP where the controlling information is part of an operation request sent from an IRP Manager to an IRP Agent. Alternatively a SON-type network can be configured in which configuration management employs a network resource model (NRM). In this approach, the model uses objects to represent the actual managed telecommunication network resources, for example specific network elements. An NRM describes managed object classes, their associations, attributes, and operations. A Managed Object (MO) is a software object that encapsulates management characteristics and behaviour of a particular network resource. The managed object is an "instance" of a "managed object class" defined in an NRM. A managed object class has attributes that provide information used to characterise the objects that belong to the class. In addition, a managed object class can have operations that represent the behaviour relevant for that class. An instance of a managed object class is sometimes called a "managed element.

Information relating to objectives and targets is provided by an IRP Manager to an IRP Agent as a relevant attribute/ parameter in SON control information. The SON control information is typically provided so that an IRP Manager can instruct an IRP Agent to monitor a network element, and in particular a KPI provided by the network element, and to compare the KPI with a corresponding target provided by the IRP Manager. Once objectives and targets have been defined, an IRP referred to as a Performance Management IRP (PM IRP) can be used to supervise results. The PM IRP defines measurements which can be used to monitor the results of SON actions. If a measured KPI fails to meet a target, the IRP Manager can then decide, if relevant criteria are met, to take appropriate action, for example it might trigger the application of an associated SON algorithm to re-configure the network element.

The targets are stored in Management Information Base (MIB) (this is a database for management purposes) and are represented by object class SonTargets. The MIB is generally in the form of a hierarchy showing the relationships between objects and object and object and attributes. The MIB may be stored and maintained in a DM (or DM/EM), and in an NE. It may be mirrored in an NM.

Technical Standard TS 32.522 defines the following targets for Hand-Over Optimisation (HOO) and Load Balancing Optimisation (LBO) in clauses 4.2 and 4.3.

| Target Name | Definition | Legal Values |
| --- | --- | --- |
| Rate of failures related to handover | (the number of failure events related to handover)/(the total number of handover events) | Integer [0 . . . 100] in unit percentage |
| RRC connection establishments failure rate related to load | The number of Failed RRC connection establishments related to load/The total number of Attempted RRC connection establishments | Integer [0 . . . 100] in unit percentage |
| E-RAB setup failure rate related to load | The number of E-RAB setup failure related to load/The total number of attempted E-RAB setup For E-RAB setup failure related to load, the causes "Reduce load in serving cell" and "Radio resources not available" defined in TS 36.413 [12] could be used. | Integer [0 . . . 100] in unit percentage |
| RRC Connection Abnormal Release Rate Related to Load | The number of abnormal RRC connection release related to load/ The total number of RRC connection release | Integer [0 . . . 100] in unit percentage |
| E-RAB Abnormal Release Rate Related to Load | The number of E-RAB abnormal release related to load/The total number of E-RAB release For E-RAB setup failure related to load, the causes "Reduce load in serving cell" and "Radio resources not available" defined in TS 36.413 [12] could be used. | Integer [0 . . . 100] in unit percentage |

The way in which targets are used in a SON network will now be described. Typically, a network operator is able to apply a target in respect of a sub-network comprising a group of cells or at the level of an individual cell, for example for an individual eNB. This may be done by the network operator defining one or more targets in the NM layer. Targets defined in the NM layer are then handled by this layer acting as IRP-Manager and are sent via the Itf-N to relevant DMs in the DM layer and to NEs (IRPAgent) and stored there in a database so that they are able to be read and may also be stored in an optimiser function which responsible for optimising a particular aspect of performance of an NE. Accordingly they may be stored either in a DM or an NE). Results are sent back to the IRPManager.

The targets, for example in the form of characteristics, may be applied as attributes assigned to objects.

| Attribute name | Support Qualifier | Read Qualifier | Write Qualifier |
| --- | --- | --- | --- |
| hoFailureRate | O *) | M | M |
| rrcConnectionEstablishmentFailureRateCharacteristic | O *) | M | M |
| rrcConnectionAbnormalReleaseRateCharacteristic | O *) | M | M |
| eRabSetupFailureRateCharacteristic | O *) | M | M |
| eRabAbnormalReleaseRateCharacteristic | O *) | M | M | where Support indicates whether an attribute needs to be present, Read indicates whether the attribute can be read, and Write indicates whether the attribute can be written to. Following known convention, O indicates Optional and M indicates Mandatory.

A characteristic may be represented as a single value, for example a percentage target to be achieved or as a number of target values across a defined range. The range can represent any of a number of system or network element features including load or available capacity. In particular, it may be a feature referred to as composite available capacity range in the cell and such a characteristic may be defined separately for uplink and downlink. The target values across the range define a characteristic curve for that target type. If there are a number of different target values rather than a single constant target value, the target values can be different values showing variation across the range so that contiguous sub-ranges are defined in which the target value is set to one numerical value in one sub-range and to another numerical value in another sub-range. Alternatively, there can be just one range, or one sub-range depending on how this is viewed, having a constant target value across the range. Where a characteristic is defined by target values which vary according to load, generally, the higher the load, the less ambitious is the target. Each characteristic is also provided with its own priority referred to as a parameter "targetPriority". This is a single numerical value provided for each characteristic. The features described in this paragraph are expressed in TS 32.522 in table 5.5.1.1 which defines attributes that are present in various Information Object Classes (IOCs).

During operation, an NE will carry out measurements and provide statistics associated with those measurements to the DM which are an indication of performance referred to as performance indicators. The DM then goes through each characteristic in turn and compares the performance indicator values relating to that characteristic to a corresponding target. In the case that there is a single target value in respect of a characteristic, there is just one comparison between a performance indicator value and the target value. In the case that there is a set of target values in respect of a characteristic varying with respect to a feature such as capacity, then the value of the feature is determined, and the target value corresponding to that feature value is used in a comparison between a performance indicator and that target value.

The priorities present in respect of each characteristic are used to determine the order in which a comparison is made between a performance indicator value and the target value. Accordingly, the characteristic with the highest priority will firstly have its performance indicator compared with the target value. The lower priority targets will be tried in descending order of priority assuming that higher priority targets have already been met. Accordingly, if there is a high priority target 1 and low priority target 2, it is checked if the high priority target 1 is met, and if so, it is then checked if the low priority target 2 is met. If both targets are met, no action needs to be taken. If the high priority target 1 is not met there is no need to check the low priority target 2 and remedial action is taken. If the high priority target 1 is met and the low priority target 2 is not met, remedial action is taken.

If a target is not met, a SON decision algorithm in the DM then determines suitable optimisation steps to be applied to the NE and then configures the NE with a new configuration via the EM for the NE. Typically, this involves the adjustment of one or more parameters which are associated with improving the performance indicator in order that it is more likely to meet the target the next time a comparison is carried out. This could, for example, be to change the configuration of the NE so that it has a greater capacity, a smaller or larger coverage area, different Hand-Over behaviour, etc.

In the foregoing a centralised optimisation approach is described. In a distributed optimisation approach, comparison with the target, determination of required optimisation, and application of the optimisation can be carried out in the NE.

It should be noted that SON-related optimisation may be carried out by the NM cooperating directly with a suitable EM rather than going via a DM.

According to a first aspect of the invention there is provided a method of managing the operation of a network element in a communications system, the method comprising:

receiving performance indicators by an optimising function;

combining together performance indicators to produce an achievement indicator comprising weighted components of performance indicators;

using the achievement indicator to determine an optimum setting of at least one parameter value;

applying the parameter value to the network element.

Preferably, the performance indicators are received by an optimising function.

The parameter value may be related to operation of the network element.

Preferably, the achievement indicator is a total target achievement. This may be a sum of weighted differences between the performance indicators and respective targets. The achievement indicator may be a composite performance indicator. This may be a sum of weighted performance indicators and respective weighted targets.

Preferably, the method uses the achievement indicator to determine an optimum setting of the value of one or several parameters. This may be an iterative process in which a number of achievement indicator versus parameter variations are checked and a balance is obtained representing a good compromise between close to optimum levels for at least some of the parameters.

Preferably, the invention relates to using targets in the management of self-organising networks. This may be self-optimisation of network elements. The targets may be defined by a network operator.

Managing the operation of the network element may involve at least one of an element manager, a Domain Manager, and a Network Manager. The method may be controlled by a management system of a network.

There may be a centralised optimisation approach. Processing relating to optimisation may be carried out by an IRP Manager. This may be in an NM layer, a DM layer, or in an EM layer. The IRP Manager may communicate with an IRP Agent in an EM layer or in an NE layer. There may be a distributed optimisation approach in which an NE carries out processing internally and optimises itself.

The network element and any managing entities may be represented with a network resource model.

Preferably, the performance indicators are related to optimisation targets. The targets may be in the form of, and/or be derivable from characteristics. The target may be part of one or more attributes which can be assigned to objects. The characteristic may be represented as a single value or as a number of target values across a defined range. The target values across the range may define a characteristic curve for that target type. In the case that there is a set of target values in respect of a characteristic varying with respect to a feature such as capacity, then a target value may be selected according to the value of the feature and then used in a comparison with a performance indicator.

If the achievement indicator does not meet its corresponding target, the NE may be re-configured by adjusting one or more parameters which are associated with improving the performance indicator in order that it is more likely to meet the target the next time a comparison is carried out.

If a performance indicator does meet its corresponding target, parameter optimisation may be carried out to determine the optimum value of the parameter.

An agent function may instruct the network element to provide it periodically with measurements of one or more performance indicators. As time passes, the agent function may receive a series of measurements of the parameter from the network element. The agent function may compare the performance indicators with a target.

Each target may have an associated parameter target weighting. There may be a number of target weightings in a target weighting list. This may be an attribute. It may be in a "SONTargets" object class. Each entry in the list may consist of a target name and its target weighting. The target weightings may have corresponding targets. The target weightings and the targets may be in different attributes.

There may be a target and a corresponding target weighting assigned to a common attribute. It may be a characteristic attribute.

The performance indicators and the target weightings may be used to obtain an achievement indicator. It may comprise the sum of the products of the individual target achievements and the individual target weights. It may comprise the sum of the products of the individual target achievements and the individual target weights. Individual target achievements may represent the difference between a performance indicator and its target.

Preferably, the achievement indicator varies with respect to a parameter. The parameter may be tuned in order to find a premium value of the achievement indicator. This may be a maximum or minimum of the achievement indicator or a local maximum or minimum. Variation of the achievement indicator with respect to the parameter may define a performance indicator curve. Finding the premium value of the achievement indicator may represent the degree to which it meets or "beats" the target corresponding to the performance indicators incorporated into the achievement indicator.

The parameter value which corresponds to the premium value of the achievement indicator may be selected and applied to the network element.

The performance indicators may be received periodically and are used to calculate an appropriate sum of weighted performance indicators. The performance indicators may be checked against a corresponding target values across a range of different parameter values.

According to the invention, a performance indicator which does not meet its corresponding target may lead to a result that the operation of the network element is acceptable if, as part of an achievement indicator, it is able to meet its corresponding target.

A weighting may have a value of 1. A weighting may have a value more than 1 or less than 1.

In one embodiment of the invention, the achievement indicator is checked to determine a minimum, or maximum, or one particular minimum or maximum of a plurality of minima or maxima, which is identified in order to determine an optimised value of the parameter.

According to the invention, the use of an achievement indicator means that a number of targets may be simultaneously applied. Preferably, weightings may reflect the real-world significance of related performance indicators. They may allow both a form of prioritisation or at least indicate levels of significance.

The method may be used to optimise handovers and balancing loads among neighbouring cells.

The method may be applied third generation (3G) systems. It may be applied in long term evolution (LTE) systems. The network element may be a base station, for example a base transceiver station, a NodeB, or an eNodeB.

The invention may be applied to a mobile communication system, such as a cellular system. It may be applied to a radio access network.

Preferably, the method may be applied to an OAM system of a network. It may relate to optimising performance in communications systems based on self-organising networks.

According to a second aspect of the invention there is provided a management entity capable of managing the operation of a network element in a communications system, the management entity comprising:

an input capable of receiving performance indicators;

a calculation block capable of combining together performance indicators to produce an achievement indicator comprising weighted components of the performance indicators; and an optimising function capable of using the achievement indicator to determine an optimum setting of at least one parameter value and of applying the parameter value to the network element.

According to a third aspect of the invention there is provided a network element capable of being managed in a communications system, the network element comprising:

an input capable of receiving performance indicators;

a calculation block capable of combining together performance indicators to produce an achievement indicator comprising weighted components of the performance indicators; and an optimising function capable of using the achievement indicator to determine an optimum setting of at least one parameter value and of applying the parameter value to the network element.

According to a fourth aspect of the invention there is provided a management system comprising a management entity capable of managing the operation of a network element in a communications system, and a network element, the management entity comprising:

an input capable of receiving performance indicators;

a calculation block capable of combining together performance indicators to produce an achievement indicator comprising weighted components of the performance indicators; and an optimising function capable of using the achievement indicator to determine an optimum setting of at least one parameter value and of applying the parameter value to the network element.

According to a fifth aspect of the invention there is provided an optimiser function capable of providing optimisation results for managing the operation of a network element in a communications system, the optimiser function comprising:

an input capable of receiving performance indicators;

a calculation block capable of combining together performance indicators to produce an achievement indicator comprising weighted components of the performance indicators; and an optimising function capable of using the achievement indicator to determine an optimum setting of at least one parameter value to be applied to the network element.

According to a sixth aspect of the invention there is provided a computer program product comprising software code that when executed on a computing system performs a method of managing the operation of a network element in a communications system according to the first aspect of the invention.

Preferably, the computer program product has executable code portions which are capable of carrying out the steps of the method.

Preferably, the computer program product is stored on a computer-readable medium.

An embodiment of the invention will now be described, by way of example only, with reference to the accompanying drawings in which.

Figure 1:
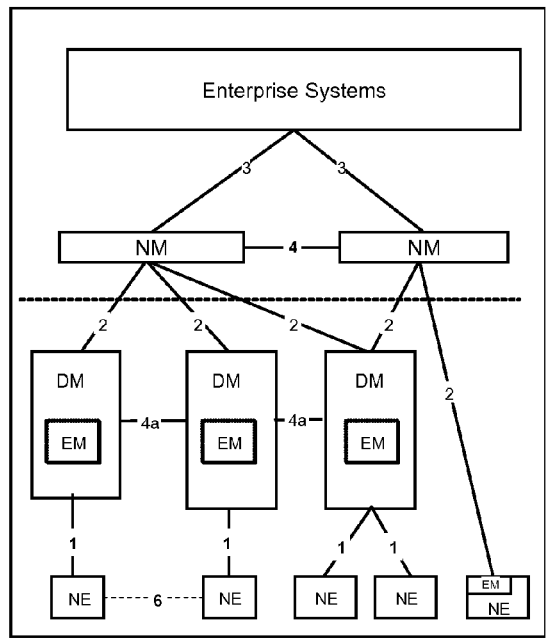
FIG. 1 shows a management architecture.

FIG. 1 has been described in the foregoing.

According to the invention, a configurable parameter "target-Weight" is allocated to each target. In the following, two embodiments are described. In a first embodiment, a targetWeitghtList attribute is added to the "SONTargets" object class so that this attribute may be associated with an object such as an NE. The list defines the weights of the supported targets. In a second embodiment, a parameter "targetPriority" and its definition for example from table 5.5.1.1. of TS 32.522 is replaced by a parameter "targetWeight" and its definition.

Referring now to the first embodiment, the targetWeightList is defined as follows:

| Attribute name | Support Qualifier | Read Qualifier | Write Qualifier |
|---|---|---|---|
| targetWeightList | M | M | M |

| Attribute Name | Definition | Legal Values |
|---|---|---|
| target-WeightList | This attribute defines the weight of the set targets in relation to each other. Each entry in the lists consists of a targetName and its target-Weight. A targetWeight of a target determines how important the target is compared to | List of {targetName; targetWeight} targetName: ENUM: hoFailureRateTarget, rrcConnectionEstablishmentFailureRateTarget, rrcConnectionAbnormalReleaseRateTarget, eRabSetupFailureRateTarget, eRabAbnormalReleaseRateTarget (Additional targetName values can be added as needed) targetWeight: positive integer |

| Attribute Name | Definition | Legal Values |
|---|---|---|
| | other targets. Targets which are not pursued have targetWeight value 0. The total target achievement is the sum of the products of the individual target achievements and the individual targetWeights. An optimization step is done if it increases the total target achievement. | |

If the targetWeightList is used, a parameter "targetPriority" can be removed, for example from table 5.5.1.1. of TS 32.522 so that it is not applied and the parameter "targetWeight" is used instead as will be described in the following.

To give an example, target weights may be set in respect of three targets:

```
targetWeightList = {
[hoFailureTarget, 300],
[rrcConnectionEstablishmentFailureRateTarget, 200]
[eRabAbnormalReleaseTarget, 100]
}
```

In this case, the target hoFailureTarget is 3 times more important than the target eRabAbnormalReleaseTarget and the target rrcConnectionEstablishmentFailureRateTarget is two times more important than the target eRabAbnormalReleaseTarget.

Referring now to the second embodiment, the parameter "targetPriority" and its definition by is replaced by a parameter "targetWeight" and its definition. This is shown in the following table which is a modification of table 5.5.1.1. of TS 32.522.

| Attribute Name | Definition | Legal Values |
|---|---|---|
| eRabAbnormalReleaseRateCharacteristic | The target is on the number of E-RAB abnormal release related to load divided by the total number of attempted E-RAB setups. This attribute allows to define for a value the composite available capacity (CAC) range in which the target is valid. For this, it contains one characteristic dependent on Uplink CAC, one for Downlink CAC: eRabAbnormalReleaseRateCharacteristicDownlink and eRabAbnormalReleaseRateCharacteristicUplink. At least one of these characteristics must be present. Together with the characteristic its targetWeight as a SON target is defined as part of this attribute. | lowerEndOfCacRange and upperEndOfCacRange: Integer 0 . . . 10000 eRabAbnormalReleaseRateTarget: Integer 0 . . . 100 (representing a percentage) targetWeight: Integer 1 . . . N. The higher the number the higher the weight. |
| | The characteristics have the following structure: eRabAbnormalReleaseRateCharacteristicDownlink: List of one or more entries, each consisting of: lowerEndOfCacRange, upperEndOfCacRange, eRabAbnormalReleaseRateTarget eRabAbnormalReleaseRateCharacteristicUplink: List of one or more entries, each consisting of: lowerEndOfCacRange, upperEndOfCacRange, eRabAbnormalReleaseRateTarget Remark: Formula for composite available capacity: Available Capacity = Cell Capacity Class Value * Capacity Value For definition of Cell Capacity Class Value and Capacity Value see TS 36.331 [6]. These definitions lead to a value range of a composite available capacity from 0 . . . 10000. 36.423 [7] has cell capacity class value as optional parameter in case of intra-LTE load balancing. If cell capacity class value is not present, than 36.423 assumes that bandwidth should be used instead to assess the capacity. This target is suitable for LBO. | |
| eRabSetupFailureRateCharacteristic | The target is on the number of E-RAB setup failures related to load divided by the total number of attempted E-RAB setups. For E-RAB setup failure related to load the causes "Reduce load in serving cell" and "Radio resources not available" defined in TS 36.413 are used. This attribute allows to define for a value the composite available capacity (CAC) range in which the target is valid. For this, it contains one characteristic dependent on Uplink CAC, one for Downlink CAC: eRabSetupFailureRateCharacteristicDownlink and eRabSetupFailureRateCharacteristicUplink. At least one of these characteristics must be present. Together with the characteristic its targetWeight as a SON target is defined as part of this attribute. The characteristics have the following structure: eRabSetupFailureRateCharacteristicDownlink: List of one or more entries, each consisting of: LowerEndOfCacRange, UpperEndOfCacRange, eRabSetUpFailureRateTarget eRabSetupFailureRateCharacteristicUplink: List of one or more entries, each consisting of: | lowerEndOfCacRange and upperEndOfCacRange and targetWeight: See eRabAbnormalReleaseRateCharacteristic eRabSetUpFailureRateTarget: Integer 0 . . . 100 (representing a percentage) |

-continued

| Attribute Name | Definition | Legal Values |
|---|---|---|
| | LowerEndOfCacRange, UpperEndOfCacRange, eRabSetUpFailureRateTarget For CAC see eRabAbnormalReleaseRateCharacteristic This target is suitable for LBO. | |
| hoFailureRate | This indicates the assigned HOO target of the number of failure events related to handover divided by the total number of handover events, together with its targetWeight. This target is suitable for HOO or LBO. | A set of two numbers: the first indicates a percentage, the second a targetWeight (see eRabAbnormalReleaseRateCharacteristic). |
| hooSwitch | This attribute determines whether the Handover parameter Optimization Function is activated or deactivated. | On, off |
| lboSwitch | This attribute determines whether the Load Balancing Optimization Function is activated or deactivated. | On, off |
| rrcConnectionAbnormalReleaseRateCharacteristic | The target is on the number of abnormal RRC connection releases related to load divided by the total number of RRC connection releases. This attribute allows to define for a value the composite available capacity (CAC) range in which the target is valid. For this, it contains one characteristic dependent on Uplink CAC, one for Downlink CAC: rrcConnectionAbnormalReleaseRateCharacteristicDownlink and rrcConnectionAbnormalReleaseRateCharacteristicUplink. At least one of these characteristics must be present. Together with the characteristic its targetWeight as a SON target is defined as part of this attribute. The characteristics have the following structure: rrcConnectionAbnormalReleaseRateCharacteristicDownlink: List of one or more entries, each consisting of: lowerEndOfCacRange, upperEndOfCacRange, rrcConnectionAbnormalReleaseRateTarget rrcConnectionAbnormalReleaseCharacteristicUplink: List of one or more entries, each consisting of: lowerEndOfCacRange, upperEndOfCacRange, rrcConnectionAbnormalReleaseRateTarget For CAC see eRabAbnormalReleaseRateCharacteristic This target is suitable for LBO. | lowerEndOfCacRange and upperEndOfCacRange and targetWeight: See eRabAbnormalReleaseRateCharacteristic rrcConnectionAbnormalReleaseRateTarget: Integer 0 ... 100 (representing a percentage) |
| rrcConnectionEstablishmentFailureRateCharacteristic | The target is on the number of RRC connection establishment failures related to load divided by the total number of attempted RRC connection establishments. This attribute allows to define for a value the composite available capacity (CAC) range in which the target is valid. For this, it contains one characteristic dependent on Uplink CAC, one for Downlink CAC: rrcConnectionEstablishmentFailureRateCharacteristicDownlink and rrcConnectionEstablishmentFailureRateCharacteristicUplink. At least one of these characteristics must be present. Together with the characteristic its targetWeight as a SON target is defined as part of this attribute. The characteristics have the following structure: rrcConnectionEstablishmentFailureRateCharacteristicDownlink: List of one or more entries, each consisting of: lowerEndOfCacRange, upperEndOfCacRange, rrcConnectionEstablishmentFailureRateTarget rrcConnectionEstablishmentFailureRateCharacteristicUplink: List of one or more entries, each consisting of: lowerEndOfCacRange, upperEndOfCacRange, rrcConnectionEstablishmentFailureRateTarget For CAC see eRabAbnormalReleaseRateCharacteristic This target is suitable for LBO. | lowerEndOfCacRange and upperEndOfCacRange and targetWeight: See eRabAbnormalReleaseRateCharacteristic rrcConnectionEstablishmentFailureRateTarget: Integer 0 ... 100 (representing a percentage) |

In the preceding tables, the following abbreviations mean the following:

RAB: Radio Access Bearer and RRC: Radio Resource Control.

Examples showing application of the target weights will now be described with reference to FIGS. 2 and 3 which each show a graph representing the variation of performance indicators with respect to a parameter. The parameter represents an adjustable, or tuneable, feature/ability of an NE such as a base station. It could relate to capacity, transmit power, antenna configuration, or some other feature such as parameters used to configure Hand-Over behaviour. In general, adjustment of the parameter involves a trade-off. For example a higher transmit power might better reach mobile terminals in a cell but can also cause interference with neighbouring base stations and also can lead to heavier power consumption. The parameter may be optimised by the NM layer of the network acting as manager to change the setting of the parameter in an NE via an agent in order to obtain an improved performance indicator. However, changing the setting of a parameter might improve one particular performance indicator at the expense of another performance indicator which may indicate poorer performance. Therefore, it will be seen that the graphs have a number of performance indicator curves which are based on pairs of actual performance indicators referred to as A and B in FIG. 2 and C and D in FIG. 3. These could be, for example hoSuccessRate, energySavingRatio.

Figure 2:
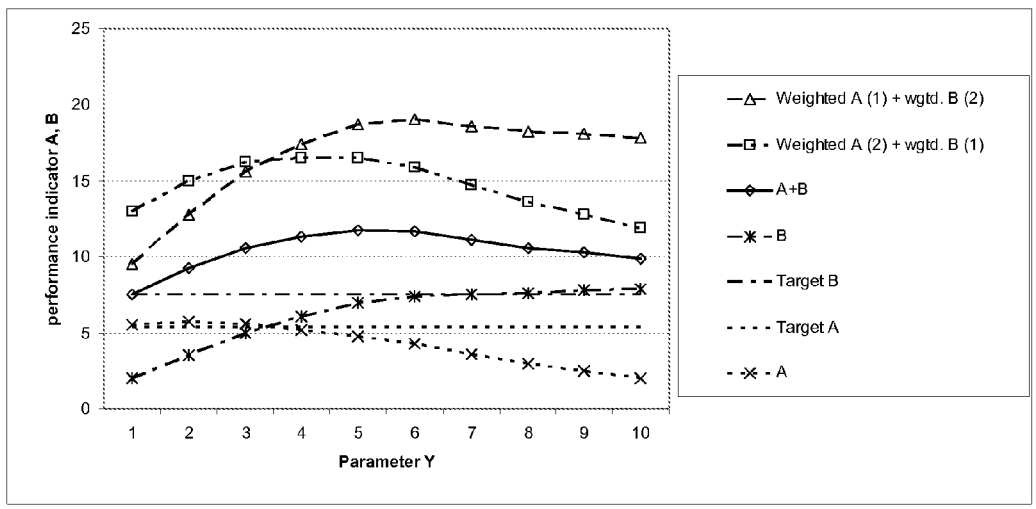
FIG. 2 shows a first graph representing the variation of performance indicators with respect to a parameter.

Referring to FIG. 2, the performance indicator curves represent individual performance indicators, combined performance indicators, combined and weighted performance indicators, and targets in respect of individual performance indicators, as follows:

(i) performance indicator A;
(ii) performance indicator B;
(iii) a first sum of weighted performance indicator A and weighted performance indicator B where the A and B weightings are 1;
(iv) a second sum of weighted performance indicator A and weighted performance indicator B where the A weighting is 1 and the B weighting is 2;
(v) a third sum of weighted performance indicator A and weighted performance indicator B where the A weighting is 2 and the B weighting is 1;
(vi) a target for performance indicator A; and
(vii) a target for performance indicator B.

It will be seen that in this embodiment, although (vi) and (vii) are referred to as curves representing targets in respect of individual performance indicators, they are in fact straight lines because the targets have constant values.

Now the use of the performance indicators will be explained. In this example, the targets represent a minimum value and optimum performance of a network element is obtained if a performance indicator stays above its corresponding target. In a first step, target values are selected. Although the targets in FIG. 2 have fixed values, that is they are constants, they are fixed because they are a single target value instance chosen from a target value varying across a range. This has been discussed in the foregoing. That is, a characteristic curve is composed of different constant target values within respective sub-ranges across a range representing, say, capacity. When it is necessary for a performance indicator to be checked against its corresponding target, the capacity is determined, a corresponding sub-range is determined, and then the target value within that sub-range is selected to be used in the comparison.

(i) and (ii) correspond to the prior art. It can be seen that if performance indicator A is checked against its corresponding target, there is a desired range of operation in terms of the parameter Y above 6.5. If performance indicator B is checked against its corresponding target, there is a desired range of operation in terms of the parameter Y under 3. Therefore, it can be seen that applying a first target (whether this is target A or target B) having a higher priority and then applying a second target having a lower priority (whether this is target B or target A) means that no outcome of parameter Y can be found which is desirable in terms of both the applicable targets. In this case, if there is to be an output which can be provided to an optimisation step, it will be based on the higher priority target thus neglecting the lower priority target. It can also be seen that applying a first target (whether this is target A or target B) and applying a second target having the same priority (whether this is target B or target A) means that there is no useful output which can be provided to an optimisation step in order to determine an optimised setting of parameter Y.

However, it can be seen that is the performance indicators can considered in a combined way, a different pictures emerges. It can be seen that when combined, there may be a maximum value. This may represent a potential optimum value of parameter Y furthermore, it can be seen that if weightings are added, which may represent the real-world significance of the performance indicators (since some aspects of performance are more important to overall NE operation), this may shift the potential optimum value of parameter Y.

Accordingly, in carrying out the invention, performance indicators A and B are received periodically and each is compared against its corresponding target. The difference between the performance indicator and its target is referred to as a target achievement and in effect represents the degree to which a target is exceeded or not met. The target achievements are then multiplied by the corresponding weightings in order to calculate weighted target achievements. These are then added together to calculate a sum of weighted target achievements referred to as a total target achievement. This sum is checked across a range of different parameter Y values. This means that the parameter Y is varied, that is an operational aspect of an NE is varied, and resultant performance indicators are obtained for each setting of the parameter Y which are then used to obtain a trend of total target achievement versus the parameter Y and the maximum total target achievement is identified in order to select an optimised value of parameter Y which is to be applied to the NE.

As a result, there is a check against the target values and another check to find a parameter Y value at which a maximum/minimum (as appropriate) is obtained. In effect this involves the application of a combined "how are things with respect to targets?" step and "is everything optimised?" step. The "everything optimised" step may be omitted if the "everything is OK" test is met and if an optimisation algorithm in the DM or the NE (as appropriate) determines that changing the configuration of the NE may jeopardise its OK status.

Once an optimum value of parameter Y is found (for example one which "beats" the target value by the greatest amount), this can be selected and applied to the NE.

The difference between the prior art and the invention is presented in the following table:

| Scenario | Priorities-based approach as in TS 32.522 | | | Weighting-based approach | |
|---|---|---|---|---|---|
| | Settings | | Result Y | Settings | Result Y |
| Target A and B equally important | A priority = 1 B priority = 1 | | No result (only one target can be achieved); if you go only for A then 2 is best, if you go only for B 10 is best. | A weight = 1 B weight = 1 | 5 |
| Target A twice as important as B | A priority = 1 B priority = 2 | | No result (only one target can be achieved); if you go only for A then 2 is best, if you go only for B 10 is best. | A weight = 2 B weight = 1 | 5 |
| Target B twice as important as A | A priority = 2 B priority = 1 | | No result (only one target can be achieved); if you go only for A then 2 is best, if you go only for B 10 is best. | A weight = 1 B weight = 2 | 6 |

Figure 3:
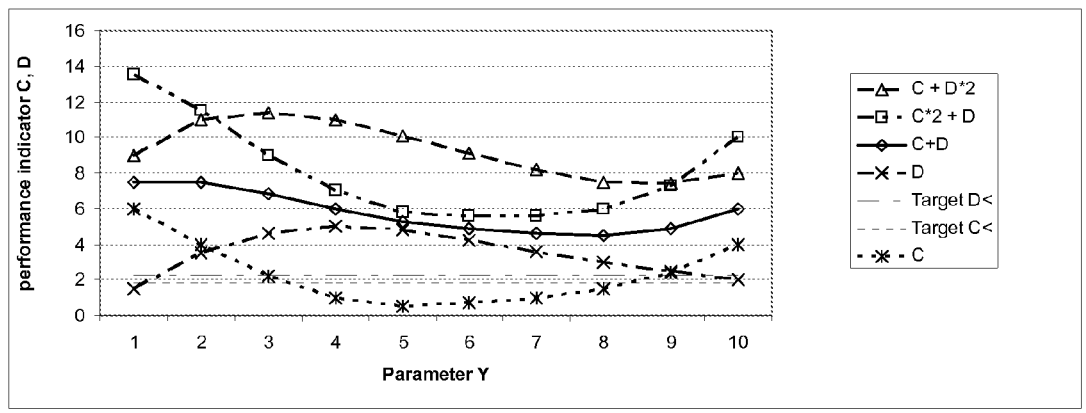
FIG. 3 shows a second graph representing the variation of performance indicators with respect to a parameter.

Referring now to FIG. 3, the curves represent individual performance indicators, combined performance indicators, combined and weighted performance indicator, and targets in respect of individual performance indicators, as follows:
(i) performance indicator C;
(ii) performance indicator D;
(iii) a first sum of weighted performance indicator C and weighted performance indicator D where the C and D weightings are 1;
(iv) a second sum of weighted performance indicator C and weighted performance indicator D where the C weighting is 1 and the D weighting is 2;
(v) a third sum of weighted performance indicator C and weighted performance indicator D where the C weighting is 2 and the D weighting is 1;

(vi) a target for performance indicator C; and
(vii) a target for performance indicator D.

In common with FIG. 2, in this embodiment, (vi) and (vii) are straight lines because the targets have constant values.

The use of the performance indicators will again be explained. In this example, the targets represent a maximum value and optimum performance of a network element is obtained if a performance indicator stays below its corresponding target. In a first step, target values are selected as described in the foregoing.

(i) and (ii) correspond to the prior art. It can be seen that if performance indicator C is checked against its corresponding target, there is a desired range of operation in terms of the parameter Y between just under 3 and just under 8. If performance indicator D is checked against its corresponding target, there is a desired range of operation in terms of the parameter Y just under 1 and another desired range of operation in terms of the parameter Y over 9. Therefore, it can be seen that similar problems to those mentioned in the foregoing in respect of A and B arise in terms of providing output which can be provided to an optimisation step in order to determine an optimised setting of parameter Y.

In carrying out the invention, performance indicators C and D are received periodically and each is compared against its corresponding target. A total target achievement is calculated in the same way as that used for the performance indicators A and B. This sum is then used in a way corresponding to that described in the foregoing.

The difference between the prior art and the invention is presented in the following table:

| Priorities-based approach as in TS 32.522 | | | Weighting-based approach | |
| --- | --- | --- | --- | --- |
| Scenario | Settings | Result Y | Settings | Result Y |
| Target C and D equally important | C priority = 1 D priority = 1 | No result (only one target can be achieved); if you go only for C then 5 is best, if you go only for D 1 is best. | C weight = 1 D weight = 1 | 8 |
| Target C twice as important as D | C priority = 1 D priority = 2 | No result (only one target can be achieved); if you go only for C then 5 is best, if you go only for D 1 is best. | C weight = 2 D weight = 1 | 6 |
| Target D twice as important as C | C priority = 2 D priority = 1 | No result (only one target can be achieved); if you go only for C then 5 is best, if you go only for D 1 is best. | C weight = 1 D weight = 2 | 9 |

In contrast to the prior art, according to the invention, a pair of performance indicators have applied suitable weightings and are combined together, and then a useful result, expressed in terms of parameter Y, can be determined which can form the basis of an optimisation step. This is illustrated by the performance indicator curves (iii), (iv), and (v) in which, by combining a pair of performance indicators, a result is provided have a definite minimum or a maximum value which can be seen to indicate a optimum value of parameter Y. As a result, there is a useful output which can be provided to an optimisation step in order to determine an optimised setting of parameter Y.

It may be that the total target achievement, even at its optimised value of parameter Y is still unsatisfactory. This may be because one or more performance indicators do not met their respective targets. In this case, other parameters may be optimised in turn, for example an additional one or an additional two parameters in order to obtain a highest (or lowest depending or the circumstances) total target achievement having a value of sufficient magnitude.

In a further refinement, rather than using linear target weightings, non-linear target weightings are used instead. For example, rather than being a positive integer, a target weighting is a function of the deviation from the target (that is a difference D referred to in the foregoing as the target achievement). For example:

targetWeight=square(max(0;achieved value−target value)).

By using the weight factors referred to in the foregoing, that is constant weight factors, a deviation of size 2*D from a target is "penalised" twice as much as a deviation of size D from a target. Furthermore, overachieving a target by size 2*T (where T is the amount by which a target is exceeded), it is "rewarded" twice as much as overachieving it by 1*T. In a variant of the invention, it is possible to make the weight factors dependent on the size of the deviation from a target, for example by using a square function, a 2*D deviation is penalized by factor 4. Other variants may be applied. The weighting may be adjusted (or calculated) differently according to whether there is exceeding the target, that is T, or not meeting the target, that is D. There might be no additional reward for exceeding the target, that is the existing constant weightings may be used within adjustment or recalculation.

It should be noted that FIGS. 2 and 3 are hypothetical cases of how a selected pair of performance indicators when combined provide particular curves and how, by the use of weightings, aspects of the curves may be emphasised so that clearer outputs are obtained to be used in subsequent optimisation. Values of weightings for particular pairs of performance indicators which are to be used can be derived by trial and error.

Referring to the foregoing, it can be seen that the performance indicator curves can have applied to one or more of their component elements (A, B, C, and/or D) a weighting of 1. This can be seen in each of (iii), (iv) and (v).

Although in the examples given above, there is a pair of performance indicators combined, it is possible according to the invention to operate on any number of performance indicators by summing together a number of weighted performance indicators so it can easily deal with 3, 4, or even 5 or more performance indicators.

Other methods of evaluation are also possible, for example that the evaluation is not simply using the difference between achieved performance indicator value and target, but applies growing (non-linear) negative scores for higher deviations than for lower differences or not counting more positive scores above a certain achievement value.

According to the prior art, there may be a competition between targets: A certain configuration may have a hoFailureRate performance indicator just slightly above target and an eRAB/rrcConnection performance indicator very much below target. A slightly different configuration may result in a just slightly below hoFailureRate target and an also only slightly below target eRAB/rrcConnection behaviour. The latter situation may in reality be acceptable to a network operator but is not considered to be acceptable.

According to the invention, the use of summed weighted performance indicators/achievements means that a number of targets may be simultaneously applied. In addition there can be compensation in respect of a slightly below target performance indicator if other performance indicators are at acceptable levels and overall the performance of a network entity is acceptable. Furthermore, this means that priorities are no longer necessary and it is the weightings themselves which can reflect the real-world significance of the related performance indicators. The invention enables this application of a number of targets to respective performance indicators without the encountering the problems which could result from a number of competing priorities. This is useful because it is expected that many more use cases in addition to HOO and LBO will be added.

An advantage of using weight factors instead of priorities is that they allow both prioritisation (with a higher weight being analogous to a higher priority), can be used to apply identical importance of several targets (by giving them the same weight) and permit simultaneous application of different targets.

In a preferred implementation, the invention is implemented in 3G and LTE communications systems, in the former case being used to manage respectively BTS and NodeB network elements and in the latter case used to manage eNodeB network elements. It may be applied to any function concerned with parameter adjustment in network elements to improve their performance. It may be applied in any suitable system, for example in an OAM system.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of managing the operation of a network element in a communications system, the method comprising:
   receiving performance indicators;
   combining together performance indicators to produce an achievement indicator comprising weighted components of performance indicators, wherein the achievement indicator comprises a sum of products of individual target achievements and individual target weights;
   using the achievement indicator to determine an optimum setting of at least one parameter value;
   applying the parameter value to the network element.

2. A method according to claim 1 in which the achievement indicator is a total target achievement.

3. A method according to claim 1 in which the achievement indicator is a sum of weighted differences between the performance indicators and respective targets.

4. A method according to claim 1 in which the performance indicators are related to optimisation targets.

5. A method according to claim 1 in which if the achievement indicator does not meet its corresponding target, the NE is re-configured by adjusting one or more parameters which are associated with improving the performance indicator in order that it is more likely to meet the target the next time a comparison is carried out.

6. A method according to claim 1 in which an agent function instructs the network element to provide it periodically with measurements of one or more performance indicators.

7. A method according to claim 1 in which there is a target for a performance indicator and a corresponding target weighting assigned to a common attribute.

8. A method according to claim 1 in which the achievement indicator varies with respect to a parameter.

9. A method according to claim 1 in which the parameter is tuned in order to find a premium value of the achievement indicator.

10. A method according to claim 1 in which a performance indicator which does not meet its corresponding target is able lead to a result that the operation of the network element is acceptable if, as part of an achievement indicator, it is able to meet the corresponding target of the achievement indicator.

11. A management entity capable of managing the operation of a network element in a communications system, the management entity comprising:
   an input capable of receiving performance indicators;
   a calculation block capable of combining together performance indicators to produce an achievement indicator comprising weighted components of the performance indicators, wherein the achievement indicator comprises a sum of products of individual target achievements and individual target weights; and
   an optimising function capable of using the achievement indicator to determine an optimum setting of at least one parameter value and of applying the parameter value to the network element.

12. A network element capable of being managed in a communications system, the network element comprising:
   an input capable of receiving performance indicators;
   a calculation block capable of combining together performance indicators to produce an achievement indicator comprising weighted components of the performance indicators, wherein the achievement indicator comprises a sum of products of individual target achievements and individual target weights; and
   an optimising function capable of using the achievement indicator to determine an optimum setting of at least one parameter value and of applying the parameter value to the network element.

13. A management system comprising a management entity capable of managing the operation of a network element in a communications system, and a network element, the management entity comprising:
   an input capable of receiving performance indicators;
   a calculation block capable of combining together performance indicators to produce an achievement indicator comprising weighted components of the performance indicators, wherein the achievement indicator comprises a sum of products of individual target achievements and individual target weights; and
   an optimising function capable of using the achievement indicator to determine an optimum setting of at least one parameter value and of applying the parameter value to the network element.

14. An optimiser function capable of providing optimisation results for managing the operation of a network element in a communications system, the optimiser function comprising:
   an input capable of receiving performance indicators;
   a calculation block capable of combining together performance indicators to produce an achievement indicator comprising weighted components of the performance indicators, wherein the achievement indicator comprises a sum of products of individual target achievements and individual target weights; and
   an optimising function capable of using the achievement indicator to determine an optimum setting of at least one parameter value to be applied to the network element.

15. A computer program product comprising software code that when executed on a computing system performs a method of managing the operation of a network element in a communications system, the method comprising steps according to claim 1.

* * * * *